(No Model.)
W. R. BUZZELL.
COMBINATION POCKET TOOL.
No. 386,055. Patented July 10, 1888.
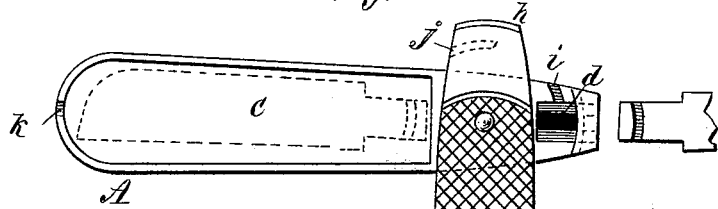
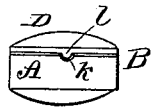
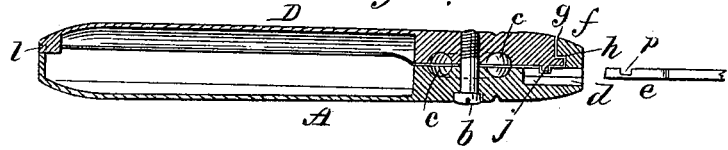
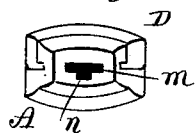
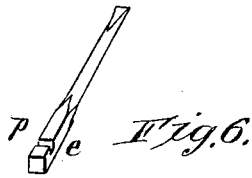
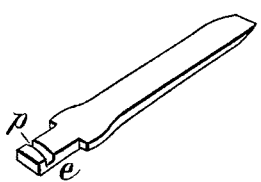
WITNESSES:
J. D. Garfield
C. Sedgwick
INVENTOR:
W. R. Buzzell
BY Munn & Co.
ATTORNEYS.

UNITED STATES PATENT OFFICE.

WILLIAM R. BUZZELL, OF SHELBURNE, MASSACHUSETTS, ASSIGNOR TO GEORGE THOMAS DRABBLE AND JOSEPH CHARLES PERRY, BOTH OF SAME PLACE, AND EDWARD RITCHIE, OF BUCKLAND, MASSACHUSETTS.

COMBINATION POCKET-TOOL.

SPECIFICATION forming part of Letters Patent No. 386,055, dated July 10, 1888.

Application filed April 12, 1887. Serial No. 234,513. (No model.)

*To all whom it may concern:*

Be it known that I, WILLIAM ROLLINS BUZZELL, of Shelburne, in the county of Franklin and State of Massachusetts, have invented a new and Improved Combination Pocket-Tool, of which the following is a specification, reference being had to the annexed drawings, forming a part thereof, in which—

Figure 1 is a side elevation showing the cover removed from the tool case. Fig. 2 is a longitudinal section. Fig. 3 is an end view. Fig. 4 is a view of the tool-receiving end of the handle, and Figs. 5 and 6 represent different tools used in connection with the handle.

Similar letters of reference indicate corresponding parts in all the views.

The object of my invention is to provide a compact combination-tool having a handle adapted to contain a number of tools, and provided in the end with a device for holding the tools in the position of use.

My invention consists in a hollow handle provided with a tool-receiving socket, and a pivoted cover adapted to hold the tools in the socket and to confine them in the hollow of the handle.

The body A of the handle B is slightly tapered, and rounded at the larger end. In the wider end of the handle is formed a cavity, C, for containing a knife-blade, a screw-driver, a brad-awl, or other tools. To the part A of the handle B is pivoted a cover, D, by means of a screw, $b$, passing through the solid portion of the part A into the solid portion of the cover D. To insure a better bearing, annular grooves $c$ are cut in the solid portions of the body and cover of the handle, the grooves being semicircular in cross-section.

In the end of the part A of the handle is formed a socket, $d$, for receiving the shanks $e$ of the various tools used in connection with the handle B. The end of the body of the handle is provided with an elevated portion, $f$, having a concave grooved surface, $g$, for receiving the end of the cover D, and the tongue $h$, formed on the inner edge of the end of the said cover. A curved groove, $i$, extends from one edge of the part A of the handle to the socket $d$, and upon the inner face of the solid portion of the cover D is formed a curved tongue, $j$, adapted to slide into the groove $i$. In the rounded end of the part A of the handle is formed a semicircular notch, $k$, and in a corresponding position upon the inner surface of the cover D is formed a rounded nib, $l$, so that as the free end of the cover D is swung over the body of the handle the nib $l$ will spring into the rounded notch $k$ and will hold the cover D in a closed position. The socket $d$ is provided with a wide mortise, $m$, with a groove, $n$, in one side communicating with the mortise.

The tools to be held by the handle are divided into two classes, one class having flat shanks fitted to the mortise $m$, the other class having rectangular shanks fitted to the groove $n$ and capable of extending across the mortise. A screw-driver (shown in Fig. 6) is provided with a wide shank, $e$, adapted to the mortise $m$, the said shank being provided with a curved groove, $p$, adapted to receive the tongue $j$ when the handle-cover D is closed over the body of the handle. The class of tools like the brad-awl, (shown in Fig. 5,) having a square shank, $e$, are furnished with a transverse groove, $p$, for receiving the tongue $j$.

The tools are inserted in the socket $d$ when the handle-cover is turned at right angles with the body of the handle, as shown in Fig. 1, and the tools are fastened in their places by swinging the handle-cover round, as already described, and bringing the rounded nib $l$ into the notch $k$ of the handle-body.

As the equivalent of the tool-fastener shown and described, I may form a tongue on the shank of each tool and provide a groove in the swinging cover of the handle for receiving the tongues of the tool-shanks.

Having thus fully described my invention, I claim as new and desire to secure by Letters Patent—

1. A tool-handle consisting of a body portion provided with a socket for receiving a tool-shank and a cover pivoted to the upper surface of the body to turn in a plane parallel therewith and provided with a tongue or lug rigidly secured to its under surface and extending partially across the same for engaging a recess in a tool-shank and automatically locking the tool in position when the cover is turned parallel with the body, substantially as described.

2. A tool-handle consisting of a hollow body portion, A, having a socket, $d$, in one end for receiving a tool-shank, and with a grooved surface, $g$, and the cover D, pivoted to the upper surface of the body and provided with a tongue or lug on its under surface for engaging the tool-shank, and with a tongue, $h$, on the end for engaging the grooved surface $g$, substantially as herein shown and described.

3. As an improved article of manufacture, a tool-handle consisting of the body portion A, having the socket $d$, the groove $i$, the grooved surface $g$, and notch $k$, and the cover D, pivoted to the upper surface of the body portion and provided with the tongues $h$ $j$ and the nib $l$, as specified.

4. The handle B, consisting of the body portion A, having the socket $d$ and groove $i$, and the pivoted cover D, having the tongue $j$, in combination with tools having transversely-grooved shanks, substantially as herein shown and described.

WILLIAM R. BUZZELL.

Witnesses:
 A. K. HAWKS,
 ALMIRA S. BUZZEL.